United States Patent
Watanabe et al.

(10) Patent No.: US 7,913,787 B2
(45) Date of Patent: Mar. 29, 2011

(54) STRUCTURE FOR MOUNTING POWER SOURCE PACK

(75) Inventors: Ko Watanabe, Aichi-ken (JP); Hajime Oyanagi, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 169 days.

(21) Appl. No.: 12/224,676

(22) PCT Filed: Feb. 21, 2007

(86) PCT No.: PCT/JP2007/053713
§ 371 (c)(1),
(2), (4) Date: Sep. 3, 2008

(87) PCT Pub. No.: WO2007/102357
PCT Pub. Date: Sep. 13, 2007

(65) Prior Publication Data
US 2009/0173558 A1    Jul. 9, 2009

(30) Foreign Application Priority Data
Mar. 6, 2006    (JP) .................. 2006-059461

(51) Int. Cl.
*B60R 16/04* (2006.01)
(52) U.S. Cl. .............. 180/68.5; 903/907; 903/951
(58) Field of Classification Search ........... 180/68.5, 180/68.2, 309; 903/907, 951; 320/112
See application file for complete search history.

(56) References Cited

U.S. PATENT DOCUMENTS

| | | | | |
|---|---|---|---|---|
| 4,216,839 A * | 8/1980 | Gould et al. | ........... | 180/65.1 |
| 5,813,491 A * | 9/1998 | Sato et al. | ........... | 180/309 |
| 6,094,927 A * | 8/2000 | Anazawa et al. | ........... | 62/239 |
| 6,189,635 B1 * | 2/2001 | Schuler et al. | ........... | 180/68.5 |
| 7,048,321 B2 * | 5/2006 | Bandoh et al. | ........... | 296/37.8 |
| 7,079,379 B2 * | 7/2006 | Yamaguchi et al. | ........... | 361/676 |
| 7,631,712 B2 * | 12/2009 | Watanabe | ........... | 180/68.5 |

FOREIGN PATENT DOCUMENTS

| | | |
|---|---|---|
| CN | 2734540 Y | 10/2005 |
| DE | 43 31 900 A1 | 3/1994 |
| JP | A-05-238273 | 9/1993 |
| JP | A-09-002080 | 1/1997 |
| JP | A-2000-233648 | 8/2000 |
| JP | A-2002-373684 | 12/2002 |
| JP | A-2002-373709 | 12/2002 |
| JP | A-2003-197277 | 7/2003 |
| JP | A-2004-161057 | 6/2004 |
| JP | A-2004-237790 | 8/2004 |
| JP | A-2004-243882 | 9/2004 |
| JP | A-2004-268779 | 9/2004 |

(Continued)

*Primary Examiner* — J. Allen Shriver, II
*Assistant Examiner* — John D Walters
(74) *Attorney, Agent, or Firm* — Oliff & Berridge, PLC (57) ABSTRACT

A power source pack is arranged on a floor in such a manner that the vehicle front side is positioned higher than the vehicle rear side. Specifically, the front side of the power source pack is placed on a cross member qualified as a structural member that is fixed to traverse the vehicle on the floor. By such a configuration, it is possible to provide a structure for mounting a power source pack that is configured to be less vulnerable to the heat penetrating from a lower surface of the floor to the interior of a cabin even if the power source pack is arranged on the floor.

8 Claims, 6 Drawing Sheets

FOREIGN PATENT DOCUMENTS

| | | |
|---|---|---|
| JP | A-2004-291715 | 10/2004 |
| JP | 2004345447 A * | 12/2004 |
| JP | A-2004-345447 | 12/2004 |
| JP | A-2004-345449 | 12/2004 |
| JP | A-2005-038678 | 2/2005 |
| JP | A-2005-306133 | 11/2005 |
| JP | A-2006-062548 | 3/2006 |
| JP | A-2007-015600 | 1/2007 |
| WO | WO 2004/070860 A1 | 8/2004 |
| WO | WO 2006-022050 A1 | 3/2006 |

* cited by examiner

STRUCTURE FOR MOUNTING POWER SOURCE PACK

TECHNICAL FIELD

The present invention relates to a structure for mounting a power source pack, and more particularly to a structure for mounting a power source pack that is mounted on a vehicle using an electric motor as a driving source, such as an electric vehicle, to supply electricity.

BACKGROUND ART

In recent years, electric vehicles using electric motors as driving sources as well as so-called hybrid cars having multiple kinds of driving sources such as electric motors and gasoline engines have been put to practical use. These electric vehicles and the like are equipped with power storage devices such as batteries or capacitors as power sources for supplying electricity as energy to the electric motors or the like. For example, secondary batteries that can be repeatedly charged and discharged, such as nickel-cadmium batteries (Ni—Cd batteries), nickel-hydride batteries or lithium-ion batteries, are used as batteries.

In a case where secondary batteries are used as a power source, they are mounted on a vehicle in such a manner that they are made up of battery modules having battery cells stacked and these battery modules are housed within a power source case. The power source case, the battery modules housed within the power source case and other internal components are collectively referred to as a power source pack.

Conventionally, a battery pack has been mounted in a luggage space (trunk). Due to a request to keep sufficient volume of the luggage space, however, a configuration in which the battery pack is arranged in a cabin may be employed depending on the types of vehicles. In a case where a power source pack is arranged on a floor panel, there are concerns that the temperature of the power source pack increases because of the heat from a lower surface of the floor panel and this has an adverse effect on the performance of the power source pack. It is assumed that, in summer, the radiant heat reflected from a road is conducted through the floor panel to the power source pack. It is also assumed that, in a vehicle where an engine is mounted, the heat from an exhaust path running on the lower surface of the floor panel is conducted through the floor panel to the power source pack as a result of the increased temperature of the exhaust path.

If a passenger spills water on a surface of the floor panel, the water may flow into the power source pack and remain there depending on a position where the power source pack is arranged.

Referring to FIG. 2 of Japanese Patent Laying-Open No. 2004-237790, a power source pack is mounted under a passenger seat. In this structure for mounting the power source pack, however, the radiant heat reflected from a road may be conducted through a floor panel to the power source pack. Furthermore, if water is spilled on a surface of the floor panel, the water may flow into the power source pack and remain there.

DISCLOSURE OF THE INVENTION

A problem to be solved by the invention is that the heat penetrating from a lower surface of a floor panel to the interior of a cabin has an adverse effect on the performance of a power source pack in a case where the power source pack is arranged on the floor panel. Therefore, an object of the present invention is to provide a structure for mounting a power source pack that is configured to be less vulnerable to the heat penetrating from a lower surface of a floor panel to the interior of a cabin.

A structure for mounting a power source pack according to the present invention is a structure for mounting a power source pack that houses a power source. The power source pack is provided on a floor panel of the vehicle and arranged in such a manner that the vehicle front side of the power source pack is positioned higher than the vehicle rear side thereof. It should be noted that the power source described in the present invention refers to what is used as a source for supplying electricity as energy to an electric motor or the like. For example, the power source includes a battery that in itself generates electricity by chemical conversion or the like, and a power storage device such as a capacitor that stores a battery supplied from the outside.

In the structure for mounting the power source pack according to the present invention, a space can be created between the power source pack and a surface of the floor panel by arranging the power source pack in such a manner that the vehicle front side of the power source pack is positioned higher than the vehicle rear side thereof. As a result, the effect of the heat penetrating from a lower surface of the floor panel to the interior of a cabin is mitigated and the performance of the power source pack is not adversely affected.

BEST MODES FOR CARRYING OUT THE INVENTION

A structure for mounting a power source pack according to an embodiment of the present invention will be described hereinafter with reference to FIGS. 1-5.

Figure 1:
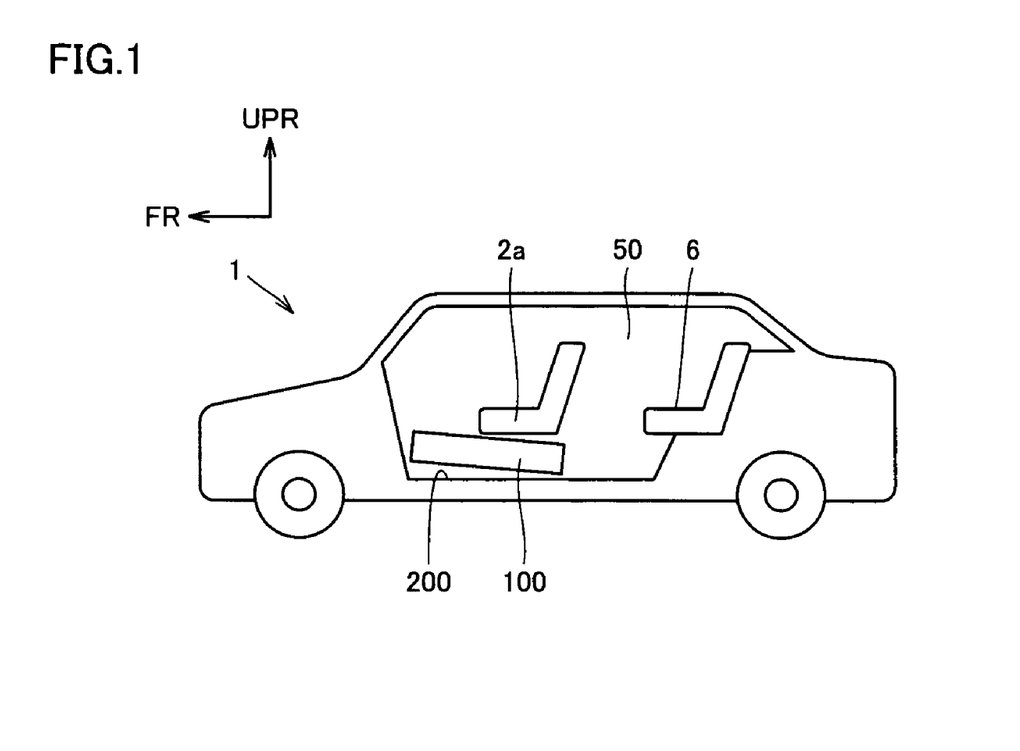
FIG. 1 is a schematic cross sectional view showing a form of a vehicle where a power source pack according to an embodiment of the present invention is mounted.
Figure 2:
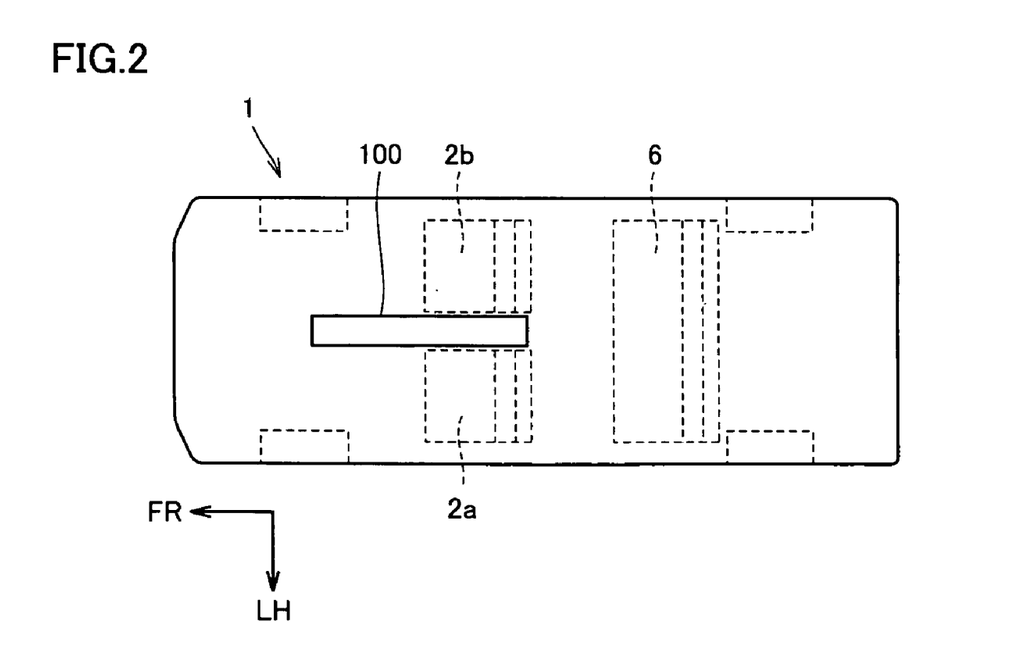
FIG. 2 is a schematic perspective plan view of a vehicle where a power source pack according to an embodiment of the present invention is mounted.

As shown in FIGS. 1 and 2, front seats 2a and 2b (see FIG. 2) as well as a rear seat 6 are arranged in a boarding space 50 of a vehicle 1. In boarding space 50, a power source pack 100 is mounted on a floor panel 200 of boarding space 50 that is located under front seats 2a and 2b and is sandwiched between front seats 2a and 2b. In the present embodiment, power source pack 100 is arranged between a driver's seat 2b and a passenger seat 2a. Although a carpet or the like as interior accessories is usually laid on floor panel 200, the illustration of the carpet or the like is not given in the description of the present embodiment. Furthermore, the floor panel described herein refers to a panel located on the bottom surface among panels partitioning and forming a cabin (passenger compartment) in boarding space 50 of vehicle 1.

Figure 3:
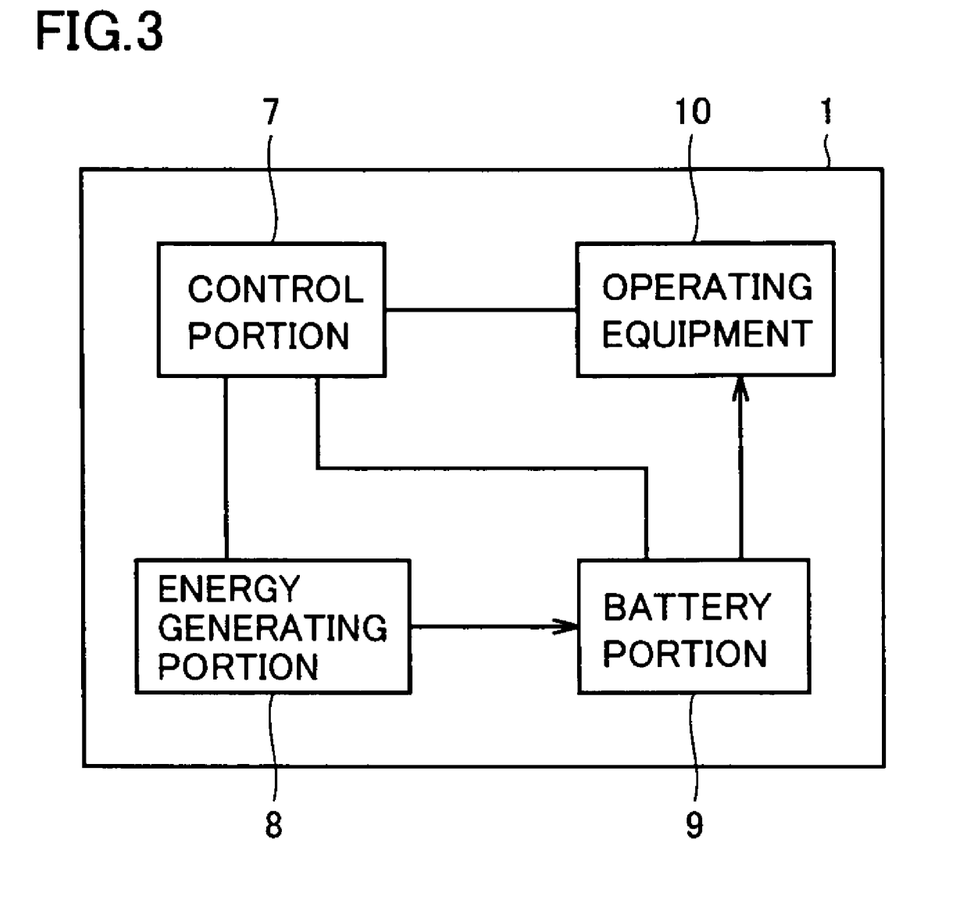
FIG. 3 is a block diagram for explaining control related to a power source pack of a vehicle according to an embodiment of the present invention.

As shown in FIG. 3, a battery portion 9 including a plurality of battery cells 120a (see FIG. 5) is connected to an energy generating portion 8 including a generator disposed at an engine (not shown) or the like of vehicle 1. In vehicle 1, power source pack 100 can be charged with electricity as energy generated at energy generating portion 8. That is, chargeable and dischargeable secondary batteries are arranged in power source pack 100 making up battery portion 9.

Battery portion 9 is used as an energy source for driving operating equipment 10 qualified as equipment mounted on the vehicle, such as an air conditioner mounted on vehicle 1. Operating equipment 10 includes equipment other than a driving system such as an electric motor that is used as a source of power for running the vehicle, for example, an air conditioner as described above, a car navigation system or a computer system mounted on the vehicle, and the like. It should be noted that operating equipment 10 may be a driving system such as an electric motor that is used as a source of power for running vehicle 1. That is, battery portion 9 may be a portion that supplies energy for the above-described driving system. Energy generating portion 8, battery portion 9 and operating equipment 10 are connected to a control portion 7. Charging and discharging of battery portion 9, operation of energy generating portion 8, a state where energy is being supplied to operating equipment 10, or the like is controlled by control portion 7.

Figure 4:
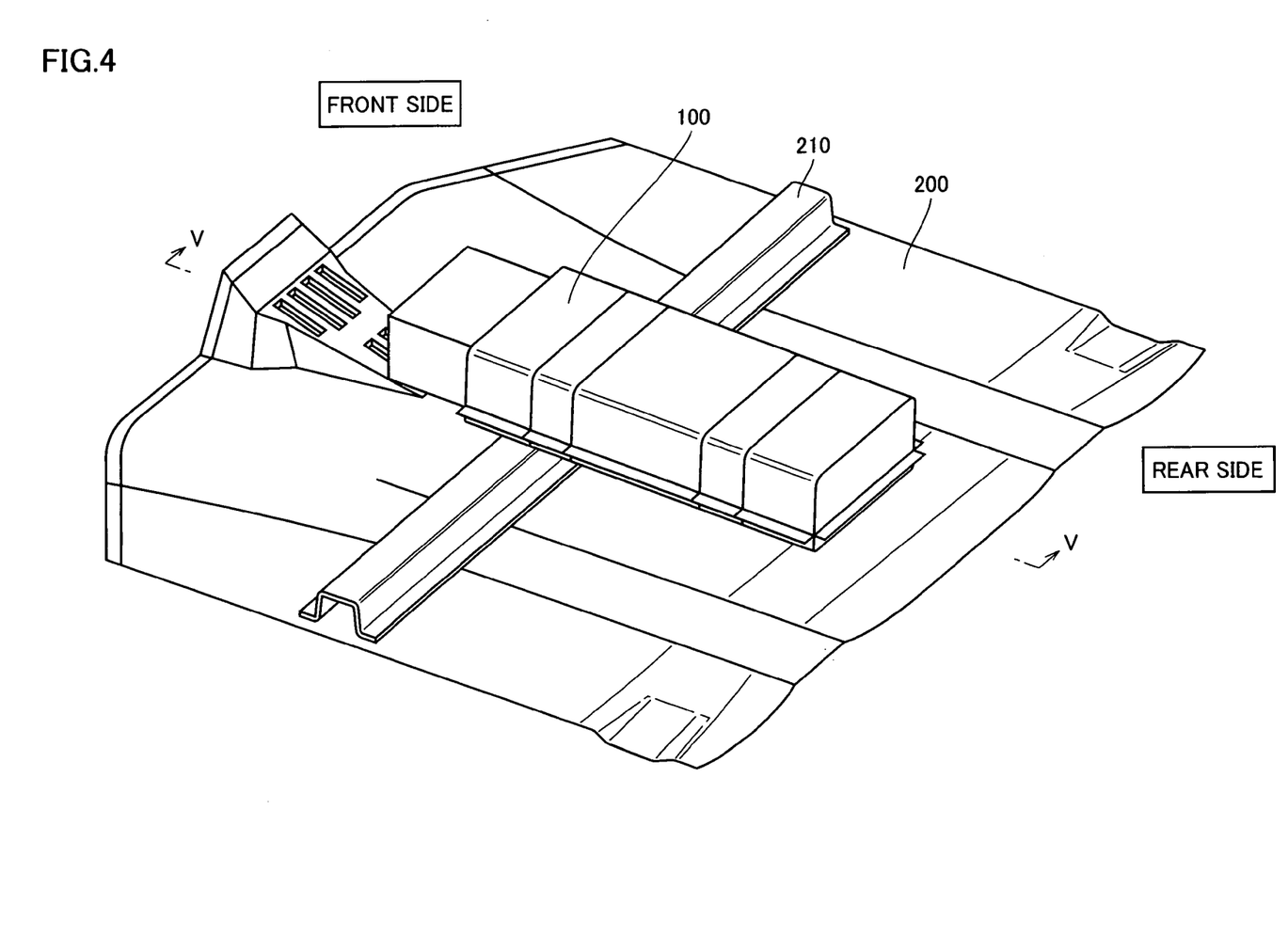
FIG. 4 is an overall perspective view of a structure for mounting a power source pack on a vehicle according to an embodiment of the present invention.
Figure 5:
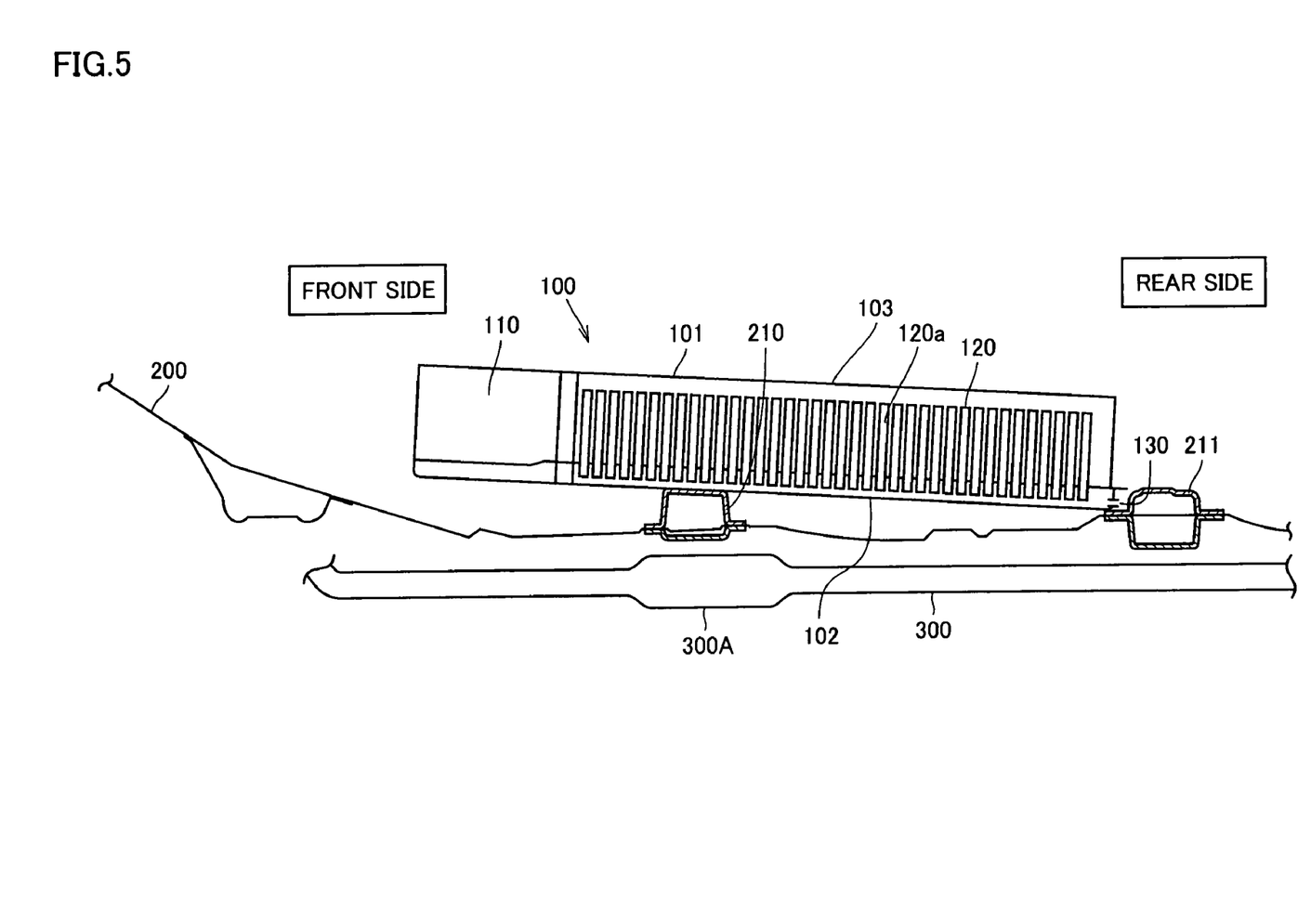
FIG. 5 is a schematic cross sectional view along the line V-V and viewed in the direction of the arrow in FIG. 4.

Turning now to FIGS. 4 and 5, a structure for mounting power source pack 100 will be specifically described. In battery pack 100 according to the present embodiment, battery modules 120 having a plurality of battery cells 120a assembled as well as an equipment portion 110 are housed within a battery case 101 as shown in a cross sectional view of FIG. 5. Secondary batteries that can be repeatedly charged and discharged, such as nickel-cadmium batteries (Ni—Cd batteries), nickel-hydride batteries or lithium-ion batteries, are used as battery cells 120a. Equipment portion 110 is arranged on the front side of power source pack 100.

Battery case 101 has a lower case 102 supporting battery modules 120 and equipment portion 110 from a lower surface side, and a battery module cover 103 covering equipment portion 110 and battery modules 120. A drain outlet 130 qualified as a liquid discharging portion for discharging water poured out into power source pack 100 to the outside is provided at a lower end on the rear side of lower case 102.

Equipment portion 110 includes a junction box, a main system relay to which high-tension cables extending from battery modules 120 are connected, an electronic equipment part, an AC100V inverter, an electronic circuit board, a fuse for a main line, or the like.

Regarding power source pack 100 having the above-described configuration, as shown in FIGS. 4 and 5, power source pack 100 is arranged on floor panel 200 in such a manner that the vehicle front side is positioned higher than the vehicle rear side with respect to a surface of floor panel 200. Specifically, the front side of power source pack 100 is placed on a cross member 210 qualified as a structural member that is fixed to traverse the vehicle on floor panel 200. A back end on the rear side of power source pack 100 is placed on a flange portion of a cross member 211 arranged on the rear side and is located on substantially the same plane as floor panel 200. Considering that power source pack 100 is placed at the vehicle, it is preferable that power source pack 100 is arranged on floor panel 200 in such a manner that it is fixed so as to be immovable.

A space can be created between power source pack 100 and the surface of floor panel 200 by arranging power source pack 100 in such a manner that the vehicle front side of power source pack 100 is positioned higher than the vehicle rear side thereof. As a result, the effect of the heat penetrating from the lower surface of floor panel 200 to the interior of the cabin is mitigated and the performance of power source pack 100 is not adversely affected.

In the present embodiment, an exhaust pipe 300 qualified as an exhaust path from the engine is located on the lower surface of floor panel 200 and a catalytic device 300A is provided in a region in the middle of exhaust pipe 300. Exhaust pipe 300 and catalytic device 300A are respectively heat sources having high temperatures (about 250° C. or higher). If power source pack 100 is arranged at a position above these devices, that is, specifically, at a position where the heat is conducted to power source pack 100 while exhaust gas is flowing through exhaust pipe 300, the heat from these devices is conducted through floor panel 200 to the interior of boarding space 50. Direct increase in temperature of power source pack 100 can, however, be prevented because the space is created between power source pack 100 and the surface of floor panel 200.

The heat penetrating from floor panel 200 escapes along the bottom surface of power source pack 100 to the vehicle front side because the vehicle front side of power source pack 100 is positioned higher. As a result, the heat does not stagnate on the bottom surface of power source pack 100. Furthermore, direct heat radiation to the interior of boarding space 50 (especially the interior of a space on the rear side) can be prevented.

In power source pack 100, equipment portion 110 that is vulnerable to heat can be placed farthest from the heat sources by arranging equipment portion 110 on the front side of power source pack 100. Moreover, even if water flows into power source pack 100 from the outside, the breakage of equipment portion 110 due to submergence or the like can be prevented because equipment portion 110 is located on the upstream side. Furthermore, the water flowing into power source pack 100 can be discharged from drain outlet 130 to the outside.

By means of cross member 210 qualified as the structural member, another member does not need to be provided separately in order to incline power source pack 100, which does not lead to an increase in the weight of the vehicle and a rise in manufacturing costs.

Figure 6:
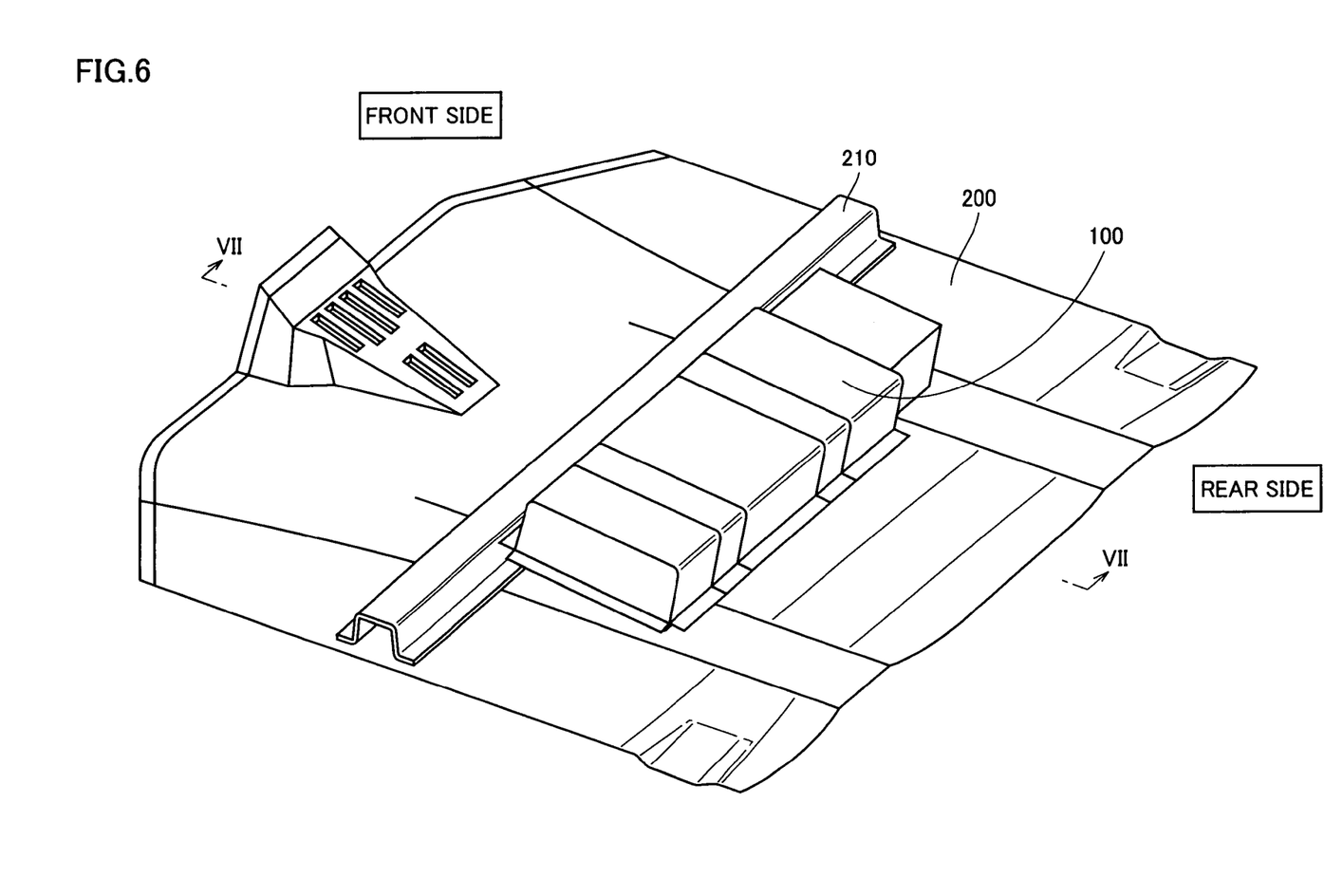
FIG. 6 is an overall perspective view of a structure for mounting a power source pack on a vehicle according to another embodiment of the present invention.
Figure 7:
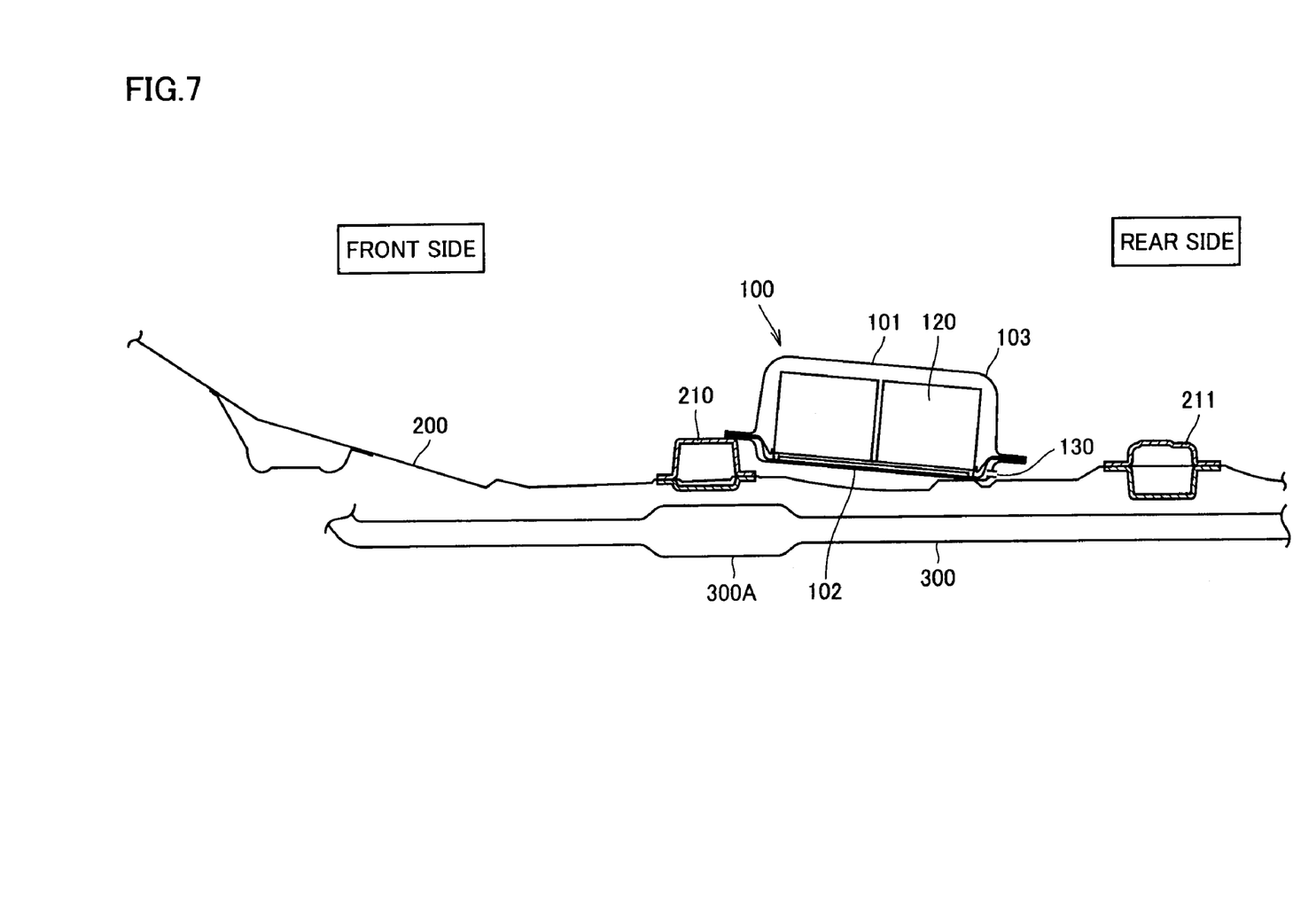
FIG. 7 is a schematic cross sectional view along the line IIV-IIV and viewed in the direction of the arrow in FIG. 6.

Although the aforementioned embodiment has been described based on a structure in which power source pack 100 is arranged between driver's seat 2b and passenger seat 2a so that the longitudinal direction of power source pack 100 corresponds to the backward and forward direction of the vehicle, power source pack 100 can also be arranged so that the longitudinal direction of power source pack 100 traverses the vehicle as shown in FIGS. 6 and 7. It should be noted that FIG. 6 is an overall perspective view of a structure for mounting a power source pack on a vehicle and FIG. 7 is a schematic cross sectional view along the line IIV-IIV and viewed in the direction of the arrow in FIG. 6.

In a case where power source pack 100 is arranged so that it traverses the vehicle in the direction orthogonal to the direction in which the vehicle is headed, power source pack 100 underlies the driver's seat and the passenger seat. In this case, the front side of power source pack 100 is placed on cross member 210 and the back end on the rear side of power source pack 100 is directly placed on floor panel 200. Furthermore, drain outlet 130 qualified as the liquid discharging portion for discharging water poured out into power source pack 100 to the outside is provided at the lower end on the rear side of lower case 102.

Thus, even if power source pack 100 is mounted in such a manner that it traverses the vehicle, the similar advantages to those of power source pack 100 as shown in FIGS. 1-5 can be offered.

Although the aforementioned embodiment has been described based on a structure in which the cross member is used to incline power source pack 100, it is also possible to employ a configuration in which other components are separately used to incline power source pack 100. Furthermore, although the aforementioned embodiment has been described by way of example based on a structure in which the present invention is applied to a hybrid vehicle that can output power of an engine and/or an electric motor to a drive shaft, the present invention is applicable to a vehicle where only an engine or an electric motor is mounted. Although the power source pack according to the embodiment has been described based on a structure in which battery modules having battery cells stacked are employed as a power source, it is also possible to employ power storage modules in which power storage cells made up of capacitors or the like are stacked. The power storage cells and power storage modules have substantially the same outer shapes as the battery cells and battery modules. Therefore, it is possible to employ the configurations in the above-described embodiments.

The embodiments disclosed herein are construed as illustrative and not as limitative in any respect. Therefore, the scope of the present invention is defined by the terms of the claims, rather than by the above-described embodiments only, and includes any modifications within the scope and meaning equivalent to the terms of the claims.

The invention claimed is:

1. A structure for mounting a power source pack that houses a power source,
    said power source pack being provided on a floor panel of a vehicle, and
    a bottom surface of said power source pack being inclined with respect to the floor panel such that a vehicle front side of said power source pack is positioned higher than a vehicle rear side thereof by placing said front side of said power source pack on a first cross member that is fixed on said floor panel of said vehicle, wherein
    an end of the power source pack is positioned on a flange of a second cross member.

2. The structure for mounting a power source pack according to claim 1, wherein
    said vehicle includes an engine as a driving source, and
    an exhaust passage is arranged below said floor panel and said power source pack is arranged above said exhaust passage.

3. The structure for mounting a power source pack according to claim 2, wherein
    said exhaust passage includes a catalytic device and said power source pack is arranged above said catalytic device.

4. The structure for mounting a power source pack according to claim 1, wherein
    said power source pack houses a power source module and an equipment portion, and
    said equipment portion is arranged on said vehicle front side in said power source pack.

5. The structure for mounting a power source pack according to claim 4, wherein
    both the power source module and the equipment portion are inclined with respect to the floor panel.

6. The structure for mounting a power source pack according to claim 1, wherein
    a liquid discharging portion is provided on said vehicle rear side of said power source pack.

7. The structure for mounting a power source pack according to claim 1, wherein
    said power source pack is arranged between a driver's seat and a passenger seat of said vehicle.

8. The structure for mounting a power source pack according to claim 1, wherein
    said vehicle is a hybrid vehicle that can selectively output power of at least one of an engine and an electric motor to a drive shaft.

* * * * *